US008290141B2

(12) United States Patent
Dyba et al.

(10) Patent No.: US 8,290,141 B2
(45) Date of Patent: Oct. 16, 2012

(54) TECHNIQUES FOR COMFORT NOISE GENERATION IN A COMMUNICATION SYSTEM

(75) Inventors: Roman A. Dyba, Cedar Park, TX (US); Perry P. He, Mountain View, CA (US); Brad L. Zwernemann, Campbell, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 1216 days.

(21) Appl. No.: 12/105,870

(22) Filed: Apr. 18, 2008

(65) Prior Publication Data

US 2009/0265169 A1 Oct. 22, 2009

(51) Int. Cl.
*H04M 9/08* (2006.01)

(52) U.S. Cl. .................................................. 379/406.03

(58) Field of Classification Search .............. 379/406.03
See application file for complete search history.

(56) References Cited

U.S. PATENT DOCUMENTS

| | | | | |
|---|---|---|---|---|
| 5,157,653 | A * | 10/1992 | Genter | 370/288 |
| 6,526,139 | B1 * | 2/2003 | Rousell et al. | 379/406.03 |
| 6,625,284 | B1 * | 9/2003 | Ariyama | 381/66 |
| 7,023,986 | B2 * | 4/2006 | Scalart et al. | 379/406.05 |
| 7,124,079 | B1 * | 10/2006 | Johansson et al. | 704/226 |
| 7,243,065 | B2 * | 7/2007 | Stephens et al. | 704/226 |
| 2003/0086382 | A1 | 5/2003 | Song et al. | |
| 2003/0093270 | A1 | 5/2003 | Domer | |
| 2004/0204934 | A1 | 10/2004 | Stephens et al. | |
| 2004/0218755 | A1 | 11/2004 | Marton et al. | |
| 2005/0041798 | A1 * | 2/2005 | Nowlin et al. | 379/392.01 |
| 2005/0278171 | A1 * | 12/2005 | Suppappola et al. | 704/227 |
| 2008/0299932 | A1 * | 12/2008 | Belogolovy et al. | 455/296 |
| 2009/0222264 | A1 * | 9/2009 | Pilati et al. | 704/233 |
| 2009/0265169 | A1 * | 10/2009 | Dyba et al. | 704/233 |

FOREIGN PATENT DOCUMENTS

WO 9642142 12/1996

* cited by examiner

*Primary Examiner* — Alexander Jamal
(74) *Attorney, Agent, or Firm* — Yudell Isidore Ng Russell PLLC

(57) ABSTRACT

A technique of operating a communication device includes dividing a frequency band associated with a background noise signal into respective sub-bands. Respective individual level estimates for each of the respective sub-bands are then determined. A total level estimate for the background noise signal is determined. Finally, a comfort noise signal (whose characteristics are based on the respective individual level estimates and the total level estimate) is provided.

16 Claims, 5 Drawing Sheets

TECHNIQUES FOR COMFORT NOISE GENERATION IN A COMMUNICATION SYSTEM

BACKGROUND

1. Field

This disclosure relates generally to a communication system and, more specifically, to techniques for comfort noise generation in a communication system.

2. Related Art

The process of distinguishing conversational speech from silence, music, noise, or other non-speech signals is generally known as voice activity detection (VAD). VAD may be implemented in a communication system using various speech processing algorithms that facilitate detection of speech. VAD may also indicate whether speech is voiced, unvoiced, or sustained. In general, known VAD algorithms trade-off delay, sensitivity, accuracy, and computational cost. To detect voice, a VAD algorithm usually extracts measured features from an input signal and compares values associated with the features with predetermined thresholds. When VAD is employed with non-stationary noise, a time-varying threshold (calculated during voice-inactive segments) is usually employed. VAD algorithms usually formulate decision rules on a frame-by-frame basis using instantaneous measures of divergence distance between speech and noise. The different measures which are used in VAD algorithms may include spectral slope, correlation coefficients, logarithm likelihood ratio, cepstral, weighted cepstral, and modified distance measures.

Most modern telephone systems (such as wireless and voice over Internet protocol (VoIP) systems) use VAD as a form of squelching, such that low-level signals are ignored. In digital transmissions, ignoring low-level signals conserves bandwidth of a communication channel by discontinuing transmission when a signal level is below a threshold. When a telephony customer detects silence, especially for a prolonged time period, the customer may believe that a transmission has been dropped and hang-up prematurely. In order to prevent premature hang-up, comfort noise has been added (e.g., at a receiver-end in wireless and VoIP systems) between voice transmissions. The generated comfort noise has usually been at a relatively low audible level, and has typically varied based on an average of a received signal.

Echo cancellation is used in telephony to remove echo from a voice communication in order to improve voice quality. Echo cancellation involves first recognizing an originally transmitted signal that re-appears, with some delay, in a transmitted or received signal. Upon recognition, an echo can be removed by subtracting the echo from a transmitted or received signal. Echo cancellation is generally implemented using a digital signal processor (DSP).

Two primary sources of echo in telephony are acoustic echo and hybrid echo. Acoustic echo arises when sound from a speaker of a telephone handset is picked up by a microphone of the telephone handset. For example, acoustic echo may occur in conjunction with hands-free car phone systems, a standard telephone in speakerphone or hands-free mode, conference telephones, installed room systems that use ceiling speakers and table-top microphones, video conferencing systems, etc. Direct acoustic path echo is attributable to sound from a speaker of a handset that enters a microphone of the handset substantially unaltered. When indirect acoustic path echo (reverberation) occurs, the echo can be difficult to effectively cancel (unlike echo associated with a direct acoustic path) as the original sound is altered by ambient space. The altered echo may be attributed to certain frequencies being absorbed by soft furnishings and reflection of different frequencies at varying strength.

Acoustic echo cancellers are usually designed to deal with changes and additions to an original signal caused by imperfections of a speaker, imperfections of a microphone, reverberant space, and physical coupling. In general, acoustic echo cancellation (AEC) algorithms approximate results of a next sample by comparing the difference between current and one or more previous samples. The information has then been used to predict how sound is altered by an acoustic space. In this case, the model of the acoustic space is continually updated. The changing nature of a sampled signal is mainly due to changes in the acoustic environment, not changes in the characteristics of a loudspeaker, a microphone, or physical coupling. That is, changes in a sampled signal are usually attributable to objects moving in an acoustic environment and movement of a microphone within the environment. For example, when a door is closed or opened, a chair is pulled in closer to a table, or drapes are opened or closed a change in reverberation of sound in an acoustic space occurs. To address changes in acoustic space, an echo cancellation algorithm may employ non-linear processing (NLP), which allows an algorithm to make changes to an acoustic space model that are suggested (but not yet confirmed) by signal comparison.

Hybrid (electric) echo is generated in public switched telephone networks (PSTNs) as a result of the reflection of electrical energy by a hybrid circuit. Hybrid echo may also be generated in voice-over-packet network systems, if the systems contain network elements (such as access gateways) that are equipped with access loop interfaces. As is known, most telephone local loops are two-wire circuits, while transmission facilities are usually four-wire circuits. A hybrid circuit or hybrid (typically, a part of an electronic device called a subscriber line interface circuit (SLIC)) converts a signal between the two and four-wire circuits. Unfortunately, when an impedance mismatch occurs, a hybrid produces a hybrid echo signal. An adaptive filter (included in a line echo canceller or a network echo canceller) learns about characteristics of the hybrid during an adaptation process. The output signal from the adaptive filter is inverted and combined with the hybrid echo signal. When the adaptation process is performed correctly, the result of combination of the hybrid echo signal and the inverted output signal of the adaptive filter produces a very small signal (called an error signal). Ideally, the error signal is small such that the error signal is not perceived audibly.

In practice, the adaptation process usually never produces an ideal characteristic of the hybrid and the error signal is often so large that other approaches for reducing the error signal are needed. A typical method of reducing the energy of the error signal is based on NLP. NLP also usually reduces natural/environmental background noise injected at a near-end of a network connection. As a result, a far-end talker is not exposed to the natural/environmental background noise injected to the telephone connection at the near-end. To compensate and produce more natural conditions, under which the far-end talker participates in the telephone call, an injection of comfort noise by the echo canceller has been employed. Ideally, comfort noise should be indistinguishable from the natural/environmental background noise present at the near-end.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
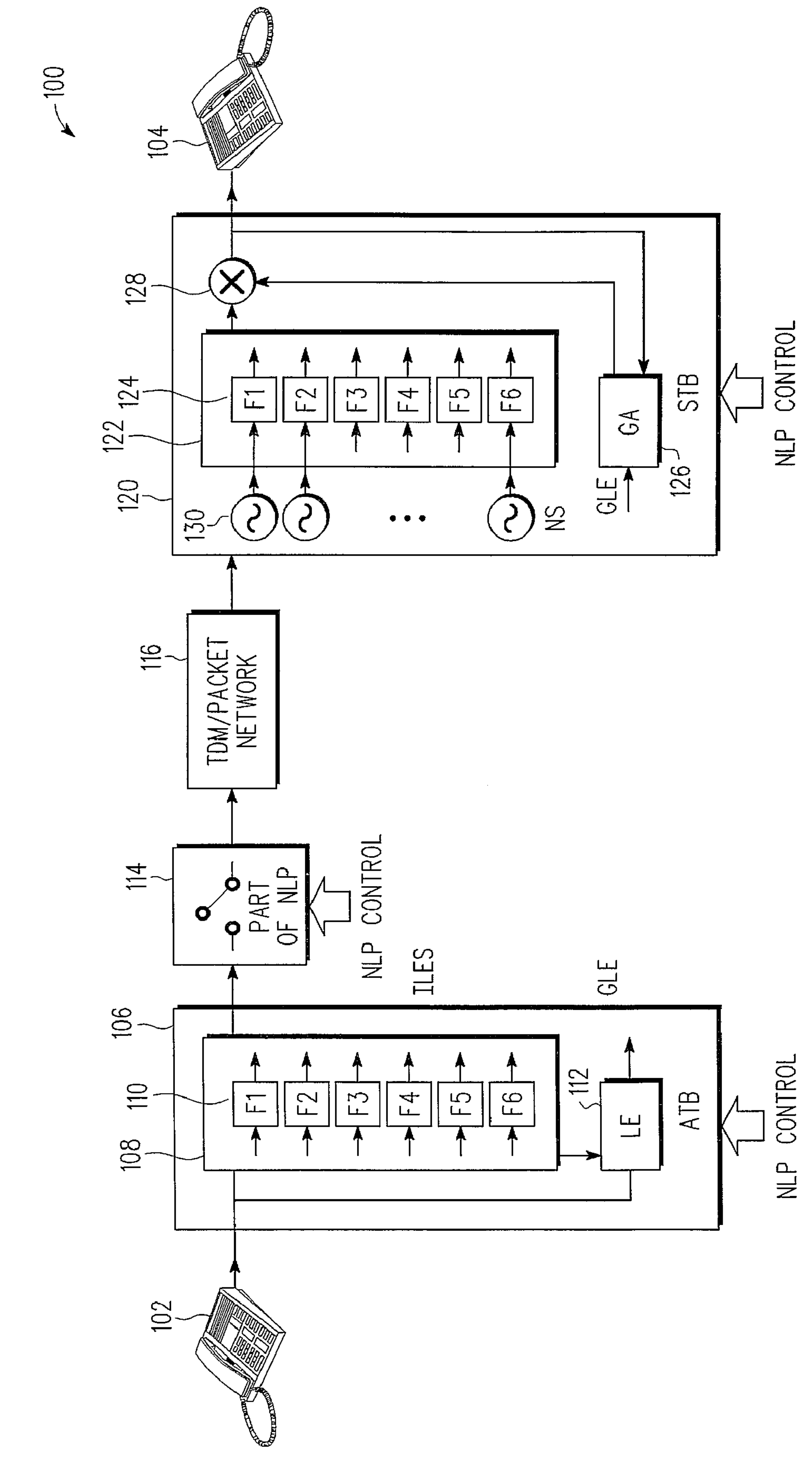
FIG. 1 is an example diagram of a relevant portion of a communication system (which carries voice communications and may carry data) that includes an analysis task block (ATB) and a synthesis task block (STB), configured according to an embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with comfort noise generation in a network/line echo canceller, it will be appreciated that the present invention is not so limited and may be embodied in various devices in a wired or wireless communication system where the introduction of comfort noise is perceived to improve voice communication quality.

Various techniques according to the present disclosure address limitations in conventional comfort noise generation (CNG) for voice processing and transmission. Today, CNG is widely used in telecommunication voice processing in conjunction with network echo cancellation, acoustic echo control, voice activity detection (VAD), etc. According to the present disclosure, CNG is enhanced by providing both signal spectrum and signal level matching capabilities at relatively low computational expense. In general, conventional spectrum matching (SM) CNG approaches are impractical in cost-effective digital signal processor (DSP) implementations, due to the computational complexity of the conventional SM CNG approaches. For example, conventional SM CNG approaches have employed uniformly distributed filters, which require more filters to cover a given bandwidth than when non-uniformly distributed filters are employed. As another example, conventional SM CNG approaches have employed finite impulse response (FIR) filters, which require more coefficients than infinite impulse response (IIR) filters.

According to various aspects of the present disclosure, practical and effective techniques are disclosed that analyze and synthesize background noise to produce comfort noise that substantially duplicates background noise in both spectral content and level. The disclosed SM CNG techniques generally improve overall voice quality of voice solutions, while at the same time incurring relatively low computational cost (in million cycles per second (MCPS)) and relatively low memory usage (when embodied in a digital signal processor (DSP) or a general purpose processor). While the discussion herein is primarily directed to implementations that employ infinite impulse response (IIR) filters, many of the techniques disclosed herein are broadly applicable to implementations that employ other filter-types (e.g., finite impulse response (FIR) filters), albeit at increased computational cost in many cases.

According to the present disclosure, a number of techniques are provided to effectively analyze dominant spectrum components in a frequency band (e.g., a telephony band ranging from 0 Hz to 4 kHz) in order to efficiently synthesize far-end comfort noise that substantially matches near-end background noise (in both spectral content and in level). According to various embodiments, an analysis task block (ATB) and a synthesis task block (STB) are employed to substantially match comfort noise with background noise. In one or more embodiments, the STB includes a global adaptive signal gain driven by data generated in the ATB. In another embodiment, the STB includes a global adaptive signal gain, as well as individual adaptive signal gains (one for each frequency sub-band), driven by data generated in the ATB.

The ATB and STB may incorporate uniformly distributed filter banks (e.g., when discrete Fourier transform (DFT) filters (such as fast Fourier transform (FFT) filters) and inverse DFT filters (such as inverse FFT (IFFT) filters are employed)) or non-uniformly distributed filter banks (e.g., when infinite impulse response (IIR) filters are employed). For example, a voice band may be sub-divided into six sub-bands, with each sub-band employing a non-uniformly distributed IIR filter in the ATB and STB and six white noise generators (one for each sub-band) in the STB. It should be appreciated that a frequency band may sub-divided into more or less than six sub-bands, depending upon a voice quality desired. It should be appreciated that as the number of sub-bands is increased, the computational complexity of a solution increases. The present techniques are particularly advantageous in applications where one or more fixed-point DSPs are implemented to facilitate CNG. It should be appreciated that the ATB may be operated in an on/off manner to reduce power requirements or when computational power is required for another task, particularly when background noise varies in a relatively slow manner.

Location of the CNG device/function in a telephony network is application specific. The CNG function may be implemented solely in hardware, solely in software, or in a combination of hardware and software in various communication devices. For example, the CNG function may be implemented within software that executes on a digital signal processor (DSP) or a general purpose processor, or within hardware of an application specific integrated circuit (ASIC) or a programmable logic device (PLD). In a typical application, the CNG device/function is configured such that a low-level background noise signal is not directly transmitted through an entire communication path. Typically, at a transmitting-end, a background noise signal is identified in terms of level and spectral content (the operations are performed by an ATB) by temporarily breaking a signal path. Parametric information (e.g., individual level estimates (ILEs) and a global level estimate (GLE)) about the background noise signal is then passed (e.g., in a control packet or a data packet) to a receiving-end. Based upon the parametric information, the STB generates a comfort noise signal that is similar (in level and spectral content) to the background noise signal at the transmitting-end. CNG, according to the present disclosure, may be integrated in, for example, voice codecs, echo controllers and echo cancellers. While many conventional CNG techniques merely match a global level of an incoming low-level background noise signal, CNG according to the present disclosure substantially matches both global level and individual levels associated with a frequency band and sub-bands, respectively, of the background noise signal.

The present disclosure is generally directed to a spectrum matching (SM) CNG solution that is a relatively inexpensive technique (in terms of MCPS) for identifying background noise signal level and spectral content. The disclosed SM CNG solutions also provide a relatively inexpensive and accurate technique for generating comfort noise at a receiving-end. Various SM CNG solutions disclosed herein employ independent noise signal generation for each individual sub-band and may include automatic signal gain adjustment, which may be particularly advantageous in fixed-point DSP implementations (due to accuracy). In one or more embodiments, the ATB and the STB each include IIR filter banks and the STB includes a random signal source array (including a white noise signal source for each IIR filter in an IIR filter bank of the STB).

In various embodiments, an STB includes a dynamic global gain adjustment mechanism (i.e., a global gain control (GGC)) that operates on a composite output of the STB. In various embodiments, the STB also includes individual gain controls (IGCs), one for each sub-band, that operate on individual filter outputs (F<n>, where n=1, 2, . . . , N) to provide dynamic local gain adjustment. According to one or more embodiments, the ATB produces a total level estimate (i.e., a composite signal that corresponds to an integrated sum of the filter outputs) and individual level estimates (i.e., individual signals that each correspond to individual filter outputs). The filters may, for example, operate at a decimated rate D>1 (i.e., D=1 corresponds to a sampling rate used in a digital telephony/voice over internet protocol (VoIP) systems).

The selection of filter-types and filter coefficients may be performed in a number of different manners. In a typical filter selection process, filter sub-bands are first defined. For example, selection of non-uniform distributed filter sub-bands may be based, at least loosely, on the Bark scale to provide sub-bands that are approximately equal on a (base ten) logarithmic scale. For a given application, experimentation may be employed to minimize a number of filter sub-bands, while at the same time producing adequate signal spectrum shaping. For example, sub-bands may be selected in consideration of relatively low-level background noise (e.g., generally lower than −40 decibels relative to 1 mW at point of zero reference level (dBm0)), limited bandwidth (e.g., a sample rate of 8 kHz), and/or relatively slow varying background noise, which reduces an accuracy needed for signal spectrum reproduction. Filter parameters, such as pass-band (Apass) and stop-band (Astop), may be selected in view of low-level signal application and cycle impact. Filters may then be synthesized using various filter types, e.g., IIR filter types such as Chebyshev Type I, Chebyshev Type II, and Elliptic filters, and a least computationally expensive filter that meets specifications may then be chosen for implementation. For example, filters may be implemented in a C++ model of an echo canceller.

Figure 5:
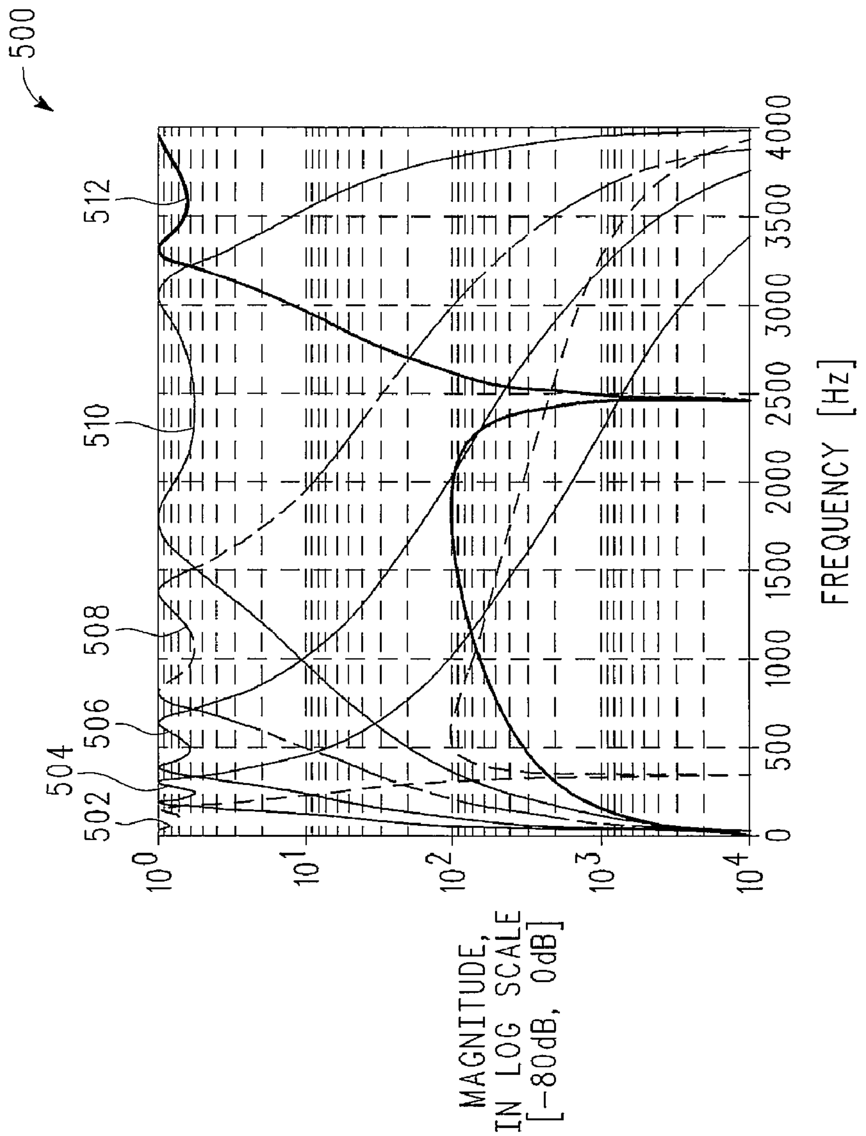
FIG. 5 is a spectrum diagram of an example filter bank (that implements a low-pass (LP) filter, four band-pass (BP) filters, and a high-pass (HP) filter) that may be employed in an ATB and a STB, according to various embodiments of the present invention.

It should be appreciated that the above discussion provides an example for generating filter coefficients for the purpose of implementing low-cost analysis and synthesis filter banks within a SM CNG functional block. The SM CNG functional block may employ N−2 band-pass (BP) IIR filters, a low-pass (LP) IIR filter (at a low-end of a frequency band), and a high-pass (HP) IIR filter (at a high-end of a frequency band). With reference to FIG. 5, a diagram depicting example filter amplitude characteristics for six sub-bands (i.e., N=6) is illustrated. It should be appreciated that the LP and HP filters may be readily employed in situations where a system BP filter that passes the frequency band of interest (e.g., having a pass-band of 0 to 4 kHz). In situations where a system BP filter is not employed, it may be generally desirable to replace the LP and HP filters with BP filters, which generally increases computational costs. In general, the techniques disclosed herein provide a relatively low-cost approach (computationally) to provide level adjustment (via global gain adjustment for a composite signal in a frequency band, as well as via individual gain adjustment for each sub-band in the frequency band) for a CNG. In the usual case, the techniques facilitate removal of cross-band correlation (e.g., caused by limited stop-band attenuation of adjacent filters) between synthesized signals in the STB by applying a random signal source array (i.e., one white noise signal source for each sub-band). Employing on-off operation of the ATB to lower computational cost may also be employed, for example, in the case of slow varying background noise and/or in the case when saving cycle time is desirable.

The SM CNG functionality may be implemented in various programming languages. For example, SM CNG functionality may be implemented in C++. Implementing the SM CNG functionality in C++ facilitates objective measurement of the disclosed techniques by comparing the spectrum of the input/output noise signals and by running special test vectors designed to facilitate evaluation of differences between level matching and spectrum matching from voice quality viewpoint. In general, spectrum matching in combination with level matching offers better voice quality than level matching alone.

Example C++ code (which is executed by, for example, a processor of an associated device, e.g., a network/line echo canceller) for performing an analysis task using an IIR filter bank is set forth below:

```
fraction sm__analys__filt__bank (ec__data *ec, fraction x, int j)
{
 accumulator tmp__ma = 0, tmp__ar = 0;
 int i;
 for (i = F__ORD[j]; i >= 1; i--) {
  ec->x__e[j][i] = ec->x__e[j][i-1];
  ec->y__e[j][i] = ec->y__e[j][i-1];
 }
 ec->x__e[j][0] = x;
 for (i = 0; i < F__ORD[j]; i++) {
  tmp__ma = tmp__ma + (B[j][i] * ec->x__e[j][i]);
  tmp__ar = tmp__ar + ((A[j][i] * ec->y__e[j][i+1])
     << L__SH__VEC[j][i]);
 }
 tmp__ma = tmp__ma + (B[j][F__ORD[j]] * ec->x__e[j][F__ORD[j]]);
 ec->y__e[j][0] = fraction(tmp__ma - tmp__ar);
 return ec->y__e[j][0];
}
```

Example code (which is executed by, for example, a processor of an associated device, e.g., a network/line echo canceller) for performing a synthesis task using an IIR filter bank is set forth below:

```
fraction sm__synthe__filt__bank (ec__data *ec)
{
 accumulator noise__gain__all = 0;
 fraction noise__gain;
 accumulator tmp__ma, tmp__ar;
 int i, j;
 for (j = 0; j < 6; j++) {
   // Filters # 1,..., # 6
   for (i = F__ORD[j]; i >= 1; i--) {
     ec->x__f[j][i] = ec->x__f[j][i-1];
     ec->y__f[j][i] = ec->y__f[j][i-1];
   }
   ec->random__seed__f[j] = random(ec->random__seed__f[j]);
   ec->x__f[j][0] = times(ec->random__seed__f[j], RND__FACT[j]);
   tmp__ma = 0;
   tmp__ar = 0;
   for (i = 0; i < F__ORD[j]; i++) {
     tmp__ma = tmp__ma + (B[j][i] * ec->x__f[j][i]);
     tmp__ar = tmp__ar +
     ((A[j][i] * ec->y__f[j][i+1]) << L__SH__VEC[j][i]);
   }
   tmp__ma = tmp__ma + (B[j][F__ORD[j]] * ec->x__f[j][F__ORD[j]]);
   ec->y__f[j][0] = fraction(tmp__ma - tmp__ar);
   noise__gain = times(CNG__GAIN__ADJ[j],
   sq__root(fraction(ec->sout__en__f[j]
     << SIG__L__SH__VEC[j])));
   noise__gain__all = noise__gain__all +
   times(noise__gain, ec->y__f[j][0]);
 }
 noise__gain__all = times(SM__GN__ALL, fraction(noise__gain__all));
 return fraction(noise__gain__all);
}
```

Example code (which is executed by, for example, a processor of an associated device, e.g., a network/line echo canceller) for implementing an analysis task function using an IIR filter bank within an energy estimation function is set forth below:

```
void energy__estimation (ec__data *ec, fraction rin, fraction sin,
          fraction echo, fraction error)
{
     if (((ec->dt__delay == 0) && (ec->max__rin < RIN__THRE)) ||
   (((ec->proc__status & (DGI__ON | DGI__START)) == 0x8) &&
(ec->sin__en < MINUS39DBM0))) {
     ...
        // filter and estimate error energies in bands F1,...,F6
     for (i = 0; i < 6; i++) {
        error__f[i] = sm__analys__filt__bank(ec, error, i);
        ec->sout__en__f[i] = weight__energy(ec->sout__en__f[i],
          times(error__f[i], error__f[i]), 9);
        }
 }
}
```

Example code (which is executed by, for example, a processor of an associated device, e.g., a network/line echo canceller) for implementing a synthesis task function using an IIR filter bank with adaptive gain within nonlinear processing (NLP) functionality is set forth below:

```
fraction nonlinear__proc(ec__data *ec, fraction x PLOT__PTR)
{
...
     if (ec->proc__status & NLP__ON) {
     ...
          noise = sm__synthe__filt__bank(ec);
          xp = xp - times(ec->decay + MINUS__1, noise);
     ...
   xp = (xp << 7) * ec->dyn__gain; //to ensure dyn__gain is not saturated
   ec->noise__am__mean = weight__energy(accumulator(ec-
```

-continued

```
>noise__am__mean),abs(xp), 5);
   temp__fact = SM__FACT1;
   if (ec->bkgd__am__mean < SM__THRES)
     temp__fact = SM__FACT2;
   delta = fraction(times(ec->bkgd__am__mean, temp__fact)) - ec-
>noise__am__mean;
   ec->dyn__gain = ec->dyn__gain + fraction(ec->dyn__gain * delta);
      }
}
```

In general, the techniques disclosed herein may be employed with IIR filter based analysis and synthesis tasks. Employing individual and global automatic level control elements to adjust sub-band levels and a global level, respectively, generally provides improved voice quality. As noted above, independent noise generators (one per sub-band) may be employed to reduce signal correlation in adjacent sub-bands (in the synthesis task). IIR filters in the analysis task may be configured to work continuously (e.g., during times indicated by double-talk functionality/nonlinear processor functionality) or in an on/off manner (e.g., in a variant of "sub-rate" approach). In general, the proposed solutions can be efficiently implemented in voice activity detection (VAD) or other functional components related to comfort noise generation. Tuning (adjusting gain coefficients, per sub-band and/or globally) may be readily performed during creation of a software version of an echo canceller.

With reference to FIG. 1, an example communication system 100 is illustrated that is configured to generate comfort noise according to various aspects of the present disclosure. As is illustrated, the system 100 includes a near-end telephone 102 and a far-end telephone 104 that are in communication via a network 116, e.g., a time-domain multiplexed (TDM) network or a packet network. A background noise signal, associated with the telephone 102, is sampled when a user is not speaking (i.e., as indicated by a nonlinear processing (NLP) control). As is shown, during silence periods a switch 114 is opened such that background noise is not transmitted from the telephone 102 to the telephone 104. During periods of silence, the ATB 106 samples (in the frequency domain) the background noise signal spectrum using a filter block 108, which includes multiple filters 110 (each of which corresponds to a different sub-band).

In FIG. 1, six of the filters (F1-F6) 110 are illustrated. It should be appreciated that more or less than six of the filters 110 may be employed, depending on the accuracy of the comfort noise desired. The filters 110 may be uniform filters (uniformly distributed in the frequency domain) or non-uniform filters (non-uniformly distributed in the frequency domain). For example, the filters 110 may be IIR filters (which are non-uniform filters) or Fourier transform filters (which are uniform filters). Outputs of each of the filters 110 facilitate determination of individual level estimates (ILEs) and a global level estimator (e.g., an integrator function) 112 provides a global level estimate (GLE) of the background noise signal. The ILEs and the GLE are provided (in a data packet or a control packet) to a synthesis task block (STB) 120, via the network 116. The STB 120 includes multiple white noise generators 130 and multiple filters 124 (included in filter block 122) that are implemented to create a comfort noise signal (that is based on the background noise signal sampled by the ATB 106) for the telephone 104 during periods of silence (i.e., when a user of the telephone 102 is not talking). It should be noted that in FIG. 1 only the signal path from the ATB 106 to the STB 120 is shown. For clarity, the information flow path for the ILEs and the GLE are not shown.

Respective outputs of the generators 130 are each coupled to respective inputs of the filters 124. It should be appreciated that the filters 110 correspond to the filters 124 in sub-band allocation and filter-type. That is, the filter blocks 108 and 122 are substantially the same. Signal levels provided at respective outputs of the filters 124 are based on the ILEs provided by the ATB 106. The respective outputs of the filters 124 are summed and provided to an input of a multiplier function 128. As is shown, a gain adjust (GA) function 126 (of the STB 120) receives an input that corresponds to the GLE and a feedback input that corresponds to an output of the multiplier function 128. The GA function 126 is configured to provide a control input to the multiplier function 128 to control a signal level at the output of the multiplier function 128 responsive to the GLE.

Figure 2:
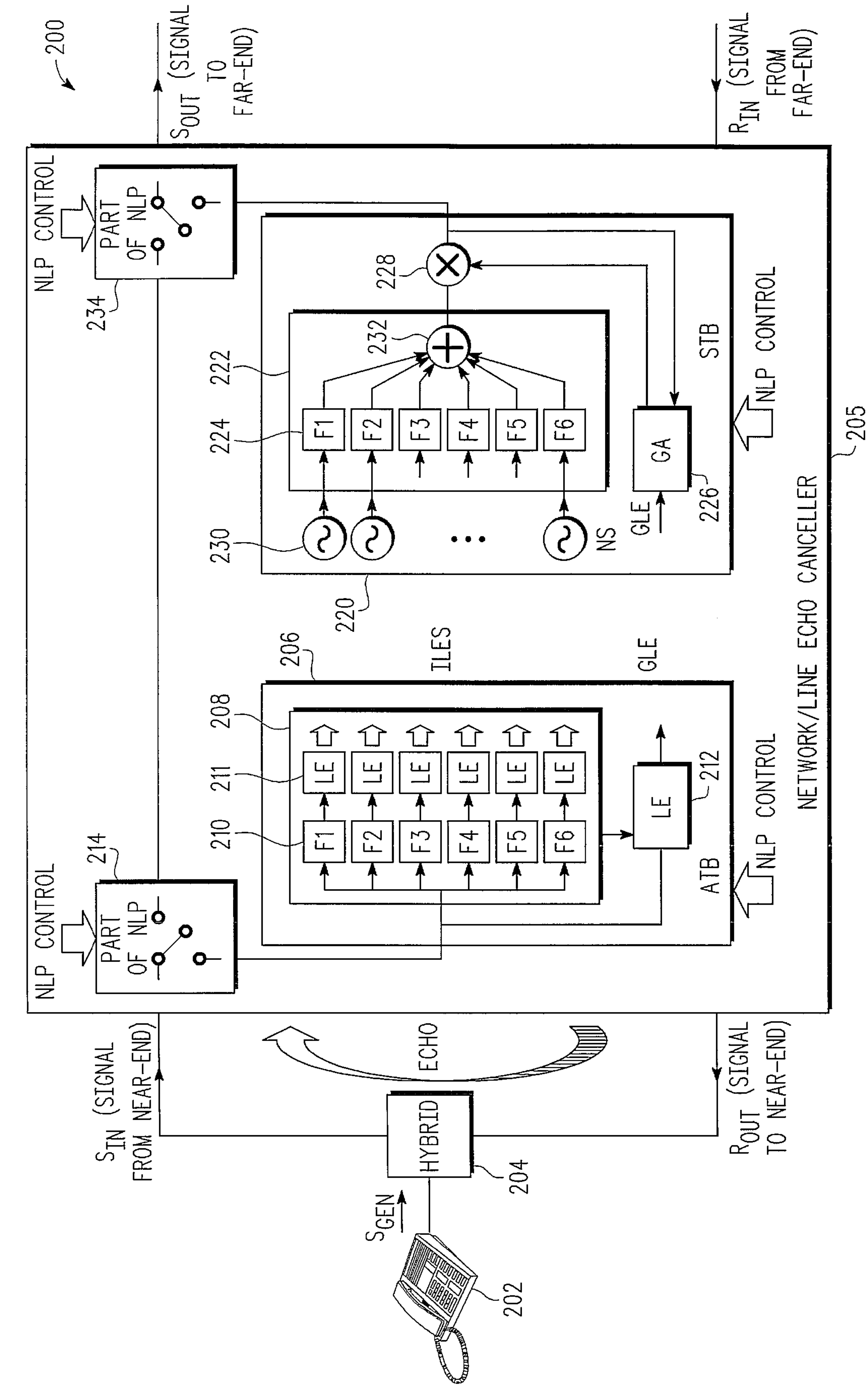
FIG. 2 is an example diagram of a relevant portion of a communication system that includes a network/line echo canceller that includes an ATB and a STB, configured according to one embodiment of the present invention.

With reference to FIG. 2, an example network/line echo canceller 205 is illustrated that is configured to generate comfort noise according to various aspects of the present disclosure. As is illustrated, the device 205 is coupled to a near-end telephone 202, via a hybrid 204. The near-end telephone 202 communicates with a far-end telephone (not shown in FIG. 2) via a network, e.g., a TDM network or a packet network. A background noise signal, associated with the telephone 102, is sampled when a user is not speaking (i.e., as indicated by a nonlinear processing (NLP) control). As is shown, during silence periods switches 214 and 234 are opened such that background noise is not transmitted from the telephone 102 to the far-end telephone. During periods of silence, the ATB 206 samples the background noise signal using a filter block 208, which includes multiple filters (F1-F6) 210 (each of which corresponds to a different sub-band). As is shown, outputs of the filters 210 are coupled to respective local level estimators (e.g., integrator functions) 211, which provide respective individual level estimates (ILEs).

It should be appreciated that more or less than six of the filters 210 may be employed, depending on the accuracy of the comfort noise desired. The filters 210 may be uniform or non-uniform filters. A global level estimator (e.g., an integrator function) 212 provides a global level estimate (GLE) of the background noise signal. The ILEs and the GLE are provided (in a data packet or a control packet) to a synthesis task block (STB) 220. The STB 220 includes multiple white noise generators 230 and multiple filters 224 (included in filter block 222) that are implemented to create a comfort noise signal (that is based on the background noise signal sampled by the ATB 206) for the far-end telephone during periods of silence (i.e., when a user of the telephone 202 is not talking). When a user of the near-end telephone 202 is not talking, the switch 214 (under NLP control) may disconnect the near-end telephone 202 from the canceller 205 to prevent echo. During this period, comfort noise may be provided from the STB 220 to a far-end telephone (not shown) via the switch 234.

Respective outputs of the generators 230 are each coupled to respective inputs of the filters (F1-F6) 224. It should be appreciated that the filters 224 correspond to the filters 210 in sub-band allocation and filter-type. Signal levels provided at respective outputs of the filters 224 are based on the ILEs provided by the ATB 206. The respective outputs of the filters 224 are summed (by adder 232) and provided to an input of a multiplier function 228. As is shown, a gain adjust (GA) function 226 (of the STB 220) receives an input that corresponds to the GLE and a feedback input that corresponds to an output of the multiplier function 228. The GA function 226 is configured to provide a control input to the multiplier function 228 to control a signal level at the output of the multiplier function 228 responsive to the GLE.

Figure 3:
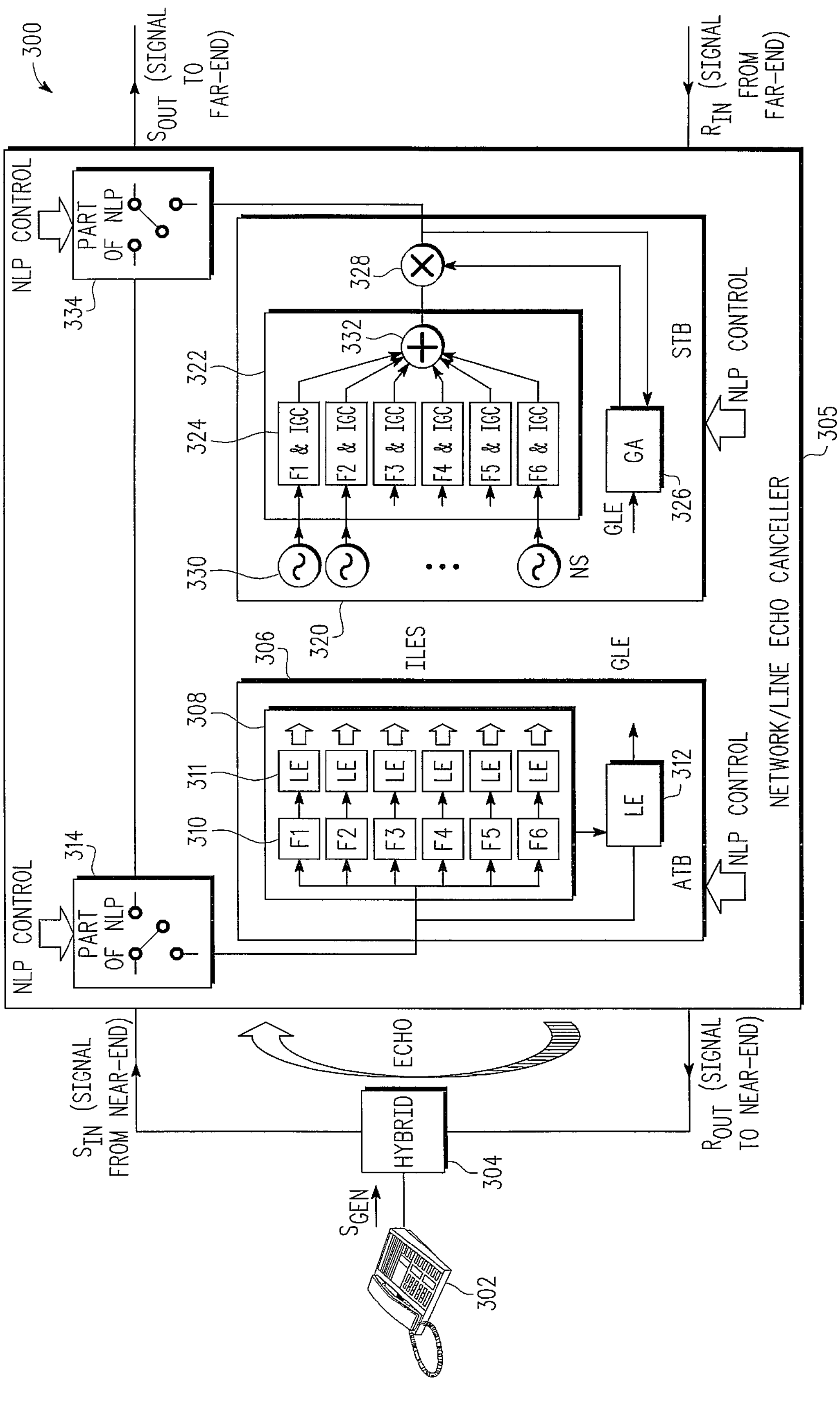
FIG. 3 is an example diagram of a relevant portion of a communication system that includes a network/line echo canceller that includes an ATB and a STB, configured according to another embodiment of the present invention.

With reference to FIG. 3, another example network/line echo canceller 305 is illustrated that is configured to generate comfort noise according to various aspects of the present disclosure. As is illustrated, the device 305 is coupled to a near-end telephone 302, via a hybrid 304. The near-end telephone 302 communicates with a far-end telephone (not shown in FIG. 3) via a network, e.g., a TDM network or a packet network. A background noise signal, associated with the telephone 302, is sampled when a user is not speaking (i.e., as indicated by a nonlinear processing (NLP) control). As is shown, during silence periods switches 314 and 334 are opened such that background noise is not transmitted from the telephone 302 to the far-end telephone. During periods of silence, the ATB 306 samples the background noise signal using a filter block 308, which includes multiple filters (F1-F6) 310 (each of which corresponds to a different sub-band). As is shown, outputs of the filters 310 are coupled to respective local level estimators 311, which provide respective individual level estimates (ILEs).

It should be appreciated that more or less than six of the filters 310 may be employed, depending on the accuracy of the comfort noise desired. The filters 310 may be uniform or non-uniform filters. A global level estimator (e.g., an integrator function) 312 provides a global level estimate (GLE) of the background noise signal. The ILEs and the GLE are provided (in a data packet or a control packet) to a synthesis task block (STB) 320. The STB 320 includes multiple white noise generators 330 and multiple filters (included in filter and individual gain control (IGC) blocks 324) that are implemented to create a comfort noise signal (that is based on the background noise signal sampled by the ATB 306) for the far-end telephone during periods of silence (i.e., when a user of the telephone 302 is not talking).

Respective outputs of the generators 330 are each coupled to respective inputs of the blocks 324. As is discussed in further detail with respect to FIG. 4, the IGCs provide for dynamic gain adjustment for outputs of the filters included in the blocks 324. It should be appreciated that the filters of the blocks 324 correspond to the filters 310 in sub-band allocation and filter-type. Signals provided at respective outputs of the IGCs of the blocks 324 are based on the ILEs provided by the ATB 306 (see FIG. 4). The respective outputs of the blocks 324 are summed (by adder 332) and provided to an input of a multiplier function 328. As is shown, a gain adjust (GA) function 326 (of the STB 320) receives an input that corresponds to the GLE and a feedback input that corresponds to an output of the multiplier function 328. The GA function 326 is configured to provide a control input to the multiplier function 328 to control a signal level at the output of the multiplier function 328 responsive to the GLE.

Figure 4:
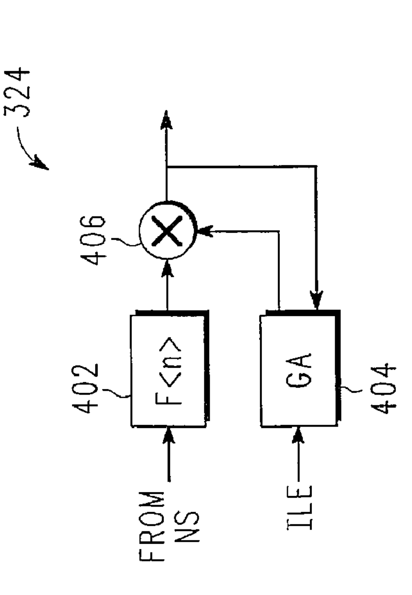
FIG. 4 is an example diagram of an independent gain control (IGC) that may be employed within a synthesis task block (STB) of the network/line echo canceller of FIG. 3.

With reference to FIG. 4, further details of an example embodiment for the blocks 324 are depicted. As is shown in FIG. 4, an output of a filter 402 is coupled to an input of multiplier 406. A gain adjust block 404 includes an input (that receives an associated ILE), a feedback input (that is coupled to an output of the multiplier 406), and a control output (that is coupled to a control input of the multiplier 406). The GA 404 controls a signal level at the output of the multiplier 406 based on the ILE. It should be appreciated that the combination of the GA 404 and the multiplier 406 (which provide dynamic local gain adjustment) are configured in a similar manner as the combination of the GA 326 and the multiplier 328 (which provide dynamic global gain adjustment).

With reference to FIG. 5, a diagram 500 depicts frequency responses for filters of an example filter block that includes six filters. A first (i.e., an LP) filter has an associated response given by response curve 502. Second, third, fourth, and fifth (i.e., BP) filters have associated responses given by response curves 504, 506, 508, and 510, respectively. A sixth (i.e., an HP) filter has an associated response given by response curve 512. As noted above, the LP and HP filters may be replaced with BP filters. From review of the diagram 500 it should be appreciated that the response curves of one or more of the filters overlap.

Figure 6:
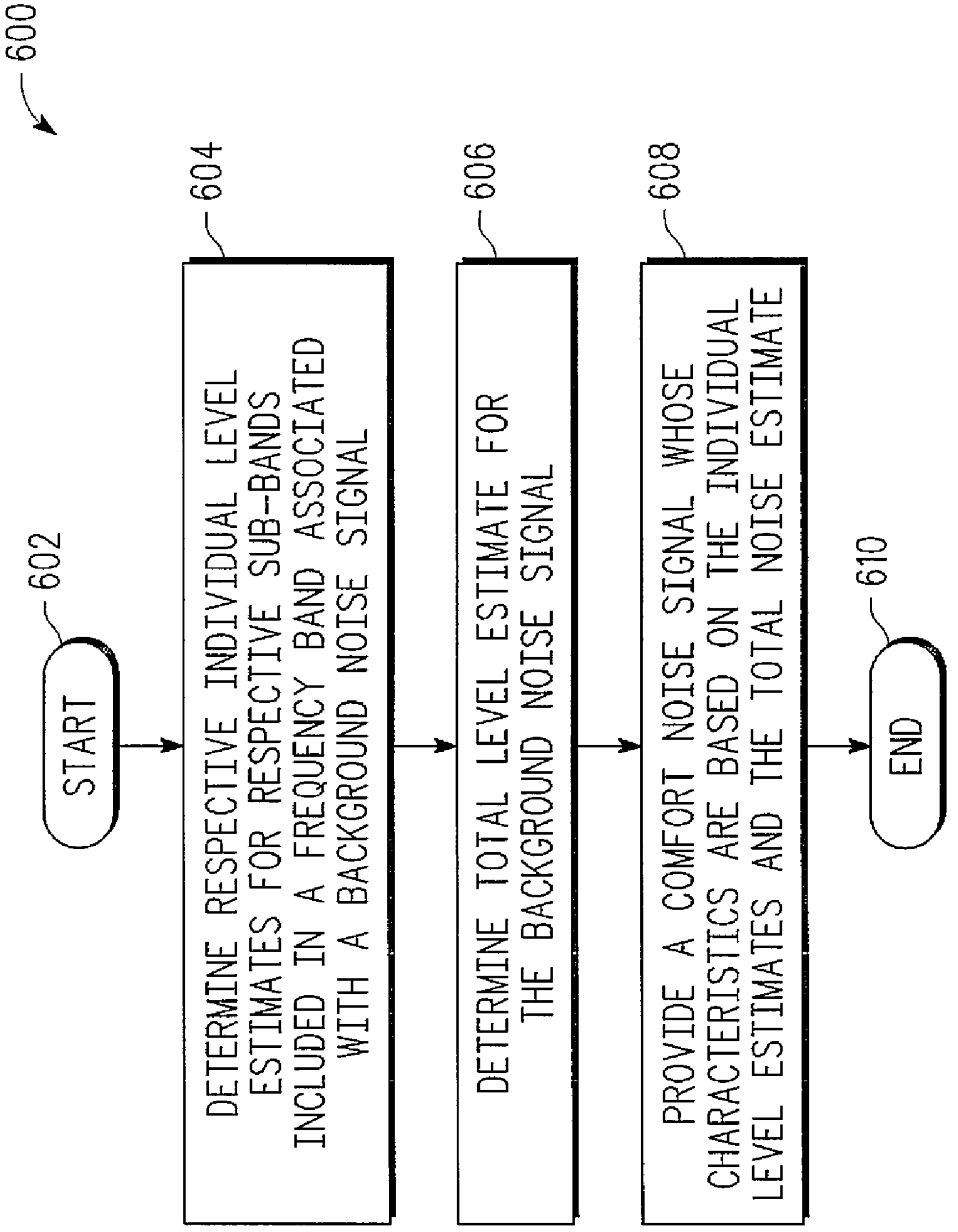
FIG. 6 is a flowchart of an example process for comfort noise generation (CNG), according to various embodiments of the present invention.

Moving to FIG. 6, an example process 600 for generating comfort noise, according to one or more embodiments of the present disclosure, is illustrated. The process 600 is initiated in block 602 at which point control transfers to block 604, where respective individual level estimates for respective sub-bands (included in a frequency band associated with a background noise signal) are determined. The individual level estimates may be, for example, derived by filtering (e.g., using IIR filters) the background noise signal to derive respective sub-band (local) level estimates for each of the respective sub-bands and integrating (using respective integrators) the respective sub-band level estimates (see, for example, ATB 306). Next, in block 606, a total level estimate for the background noise signal is determined. The total level estimate may be derived by integrating (using an integrator) the background noise signal. Then, in block 608, a comfort noise signal whose characteristics are based on the respective individual level estimates and the total level estimate are provided. The comfort noise signal may be provided, for example, by dynamically gain adjusting an intermediate noise signal based on the total level estimate. In this case, the intermediate noise signal corresponds to a sum of respective (dynamically or statically) gain adjusted filtered white noise signals, which correspond to filtered white noise signals that are gain adjusted based on the respective individual level estimates. Following block 608, control transfers to block 610, where the process 600 terminates.

Accordingly, a number of comfort signal generation techniques have been disclosed herein that generally improve quality of a voice communication system.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in various embodiments of the present invention may be implemented using any combination of software, firmware or hardware. As a preparatory step to practicing the invention in software, code (whether software or firmware) according to a preferred embodiment will typically be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. For example, the comfort noise generation techniques disclosed herein are generally broadly applicable to wired and wireless communication systems that facilitate voice communication, in addition to data communication. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as “first” and “second” are used to arbitrarily distinguish between the elements such terms describe. Thus, these terms are not necessarily intended to indicate temporal or other prioritization of such elements.

What is claimed is:

1. A method of operating a communication device, comprising:

determining respective individual level estimates for respective sub-bands included in a frequency band associated with a background noise signal at a transmitting device;

determining a total level estimate for the background noise signal;

generating respective white noise signals for each of the respective sub-bands;

filtering the respective white noise signals to provide filtered white noise signals;

gain adjusting the filtered white noise signals based on the respective individual level estimates to provide respective gain adjusted filtered white noise signals;

summing the respective gain adjusted filtered white noise signals to provide an intermediate noise signal; and dynamically gain adjusting the intermediate noise signal based on the total level estimate to generate a comfort noise signal at a receiving device.

2. The method of claim 1, further comprising:

filtering the background noise signal to derive respective sub-band level estimates for each of the respective sub-bands;

integrating the respective sub-band level estimates to derive the respective individual level estimates; and integrating the background noise signal to derive the total level estimate.

3. The method of claim 2, wherein the filtering the background noise signal further comprises:

filtering, using respective infinite impulse response filters, the background noise signal to derive the respective sub-band level estimates for each of the respective sub-bands.

4. The method of claim 1, wherein the filtering the respective white noise signals further comprises:

filtering, using respective infinite impulse response filters, the respective white noise signals to provide the filtered white noise signals.

5. The method of claim 1, wherein the respective sub-bands are not uniform.

6. The method of claim 5, wherein at least some of the respective sub-bands overlap.

7. A communication device, comprising:

an analysis task block configured to:

divide a frequency band associated with a background noise signal into respective sub-bands, wherein the background noise signal is associated with a transmitting device;

determine respective individual level estimates for each of the respective sub-bands; and determine a total level estimate for the background noise signal; and a synthesis task block in communication with the analysis task block, wherein the synthesis task block is configured to:

generate respective white noise signals for each of the respective sub-bands;

filter the respective white noise signals to provide filtered white noise signals;

gain adjust the filtered white noise signals based on the respective individual level estimates to provide respective gain adjusted filtered white noise signals;

sum the respective gain adjusted filtered white noise signals to provide an intermediate noise signal; and dynamically gain adjust the intermediate noise signal based on the total level estimate to generate a comfort noise signal at a receiving device.

8. The communication device of claim 7, wherein analysis task block is further configured to:

filter the background noise signal to derive respective sub-band level estimates for each of the respective sub-bands;

integrate the respective sub-band level estimates to derive the respective individual level estimates; and integrate the background noise signal to derive the total level estimate.

9. The communication device of claim 8, wherein the analysis task block includes multiple infinite impulse response filters that are each configured to filter one of the respective sub-bands of the background noise signal to derive the respective sub-band level estimates.

10. The communication device of claim 7, wherein the synthesis task block includes multiple infinite impulse response filters that are each configured to filter one of the respective white noise signals.

11. The communication device of claim 7, wherein the synthesis task block includes:

multiple white noise generators each configured to generate the respective white noise signals for each of the respective sub-bands;

multiple infinite impulse response filters that are each in communication with one of the multiple white noise generators, wherein the multiple infinite impulse response filters are each configured to filter one of the respective white noise signals to provide the filtered white noise signals;

multiple individual gain controls each in communication with one of the multiple infinite impulse response filters, wherein the multiple individual gain controls are each configured to dynamically gain adjust one of the filtered white noise signals based on an associated one of the respective individual level estimates to provide the respective gain adjusted filtered white noise signals;

a summer configured to sum the respective gain adjusted filtered white noise signals to provide the intermediate noise signal; and a global gain control configured to dynamically gain adjust the intermediate noise signal, based on the total level estimate, to provide the comfort noise signal.

12. The communication device of claim 7, wherein the respective sub-bands are not uniform.

13. The communication device of claim 12, wherein at least some of the respective sub-bands overlap.

14. The communication device of claim 7, wherein the communication device includes a fixed-point digital signal processor.

15. The communication device of claim 7, wherein the communication device is incorporated within an echo canceller.

16. A method of operating a communication device, comprising:

filtering a background noise signal to derive sub-band level estimates for respective sub-bands included in a frequency band associated with the background noise signal, wherein the background noise signal is associated with a transmitting device;

integrating the respective sub-band level estimates to derive respective individual level estimates;

generating respective white noise signals for each of the respective sub-bands;

filtering the respective white noise signals to provide filtered white noise signals;

dynamically gain adjusting the filtered white noise signals based on the respective individual level estimates to provide respective gain adjusted filtered white noise signals;

summing the respective gain adjusted filtered white noise signals to provide an intermediate noise signal;

integrating the background noise signal to derive a total level estimate; and dynamically gain adjusting the intermediate noise signal based on the total level estimate to generate a comfort noise signal at a receiving device.

* * * * *